United States Patent [19]
Kataumi et al.

[11] Patent Number: 5,588,330
[45] Date of Patent: Dec. 31, 1996

[54] GEAR SHIFTING DEVICE WITH LOCKING DISENGAGEABLE MECHANISM MANUALLY OPERATED BY A TOOL

[75] Inventors: Yoshimasa Kataumi; Yoshihiro Takikawa, both of Shizuoka, Japan

[73] Assignee: Fujikiko Kabushiki Kaisha, Tokyo, Japan

[21] Appl. No.: 403,058

[22] Filed: Mar. 13, 1995

[30] Foreign Application Priority Data

Mar. 31, 1994 [JP] Japan .................................. 6-063480

[51] Int. Cl.6 .................................................. B60K 17/00
[52] U.S. Cl. ...................... 74/483 R; 74/477; 74/473 R; 192/4 A
[58] Field of Search ................................ 74/483 R, 477, 74/473 R; 192/4 A

[56] References Cited

U.S. PATENT DOCUMENTS

| | | | |
|---|---|---|---|
| 5,187,999 | 2/1993 | Kobayashi et al. | 74/483 R |
| 5,309,744 | 5/1994 | Kito et al. | 74/483 R |
| 5,421,792 | 6/1995 | Kataumi et al. | 74/477 |
| 5,431,266 | 7/1995 | Ito et al. | 192/4 A |
| 5,431,267 | 7/1995 | Togano et al. | 192/4 A |
| 5,465,818 | 11/1995 | Osborn et al. | 192/4 A |

OTHER PUBLICATIONS

"The Weekly Service Report", Nissan Motor Company Ltd., Introduction of R32 Type of Automobile, vol. 622, R32–1, pp. C39 to C41, 1989.

*Primary Examiner*—Charles A. Marmor
*Assistant Examiner*—David Fenstermacher
*Attorney, Agent, or Firm*—Hopkins & Thomas

[57] ABSTRACT

A gear shifting device includes a frame, a shifting lever with a positioning pin pivotably attached to the frame, a locking member pivotably attached to the frame for preventing the positioning pin from falling when the shifting lever is in a Parking position, an actuator for operating the locking member and a hand-operated locking disengageable mechanism. The hand-operated locking disengageable mechanism has a disengaging member slidably attached to the frame for moving the locking member to the unlocked position, a compression spring for applying repulsive force on the disengaging member, a core pin removably attached to the frame so as to oppose the disengaging member, the core pin being rotatable between its locked position and unlocked position by aid of a tool and a lid member removably attached to the frame so as to cover the core pin.

12 Claims, 9 Drawing Sheets

GEAR SHIFTING DEVICE WITH LOCKING DISENGAGEABLE MECHANISM MANUALLY OPERATED BY A TOOL

BACKGROUND OF THE INVENTION

The present invention relates to a gear shifting device and, in particular, to a gear shifting device for an automatic transmission of a vehicle.

Conventional arts include a gear shifting device for an automatic transmission of a vehicle disclosed in "the weekly service report" published by Nissan Motor Company Ltd.("Introduction of R32 type of automobile" Vol. 622; R32-1 pages C39 to C41, 1989) FIG. 1 is a schematic perspective view showing an essential part of the above conventional gear shifting device. As shown in the figure, the gear shifting device generally consists of a locking member 103 and a solenoid 105 as an electro-magnetic actuator both of which are arranged at a lower section of a shifting lever 101.

The locking member 103 is positioned under a positioning pin 107 and supported to rotate between a locked position and an unlocked position. The locking member 103 is provided with a slit 103a which allows the positioning pin 107 of the shifting lever 101 to be lowered at the locked position of the locking member 103.

The locking member 103 is connected with a solenoid rod 105a of the solenoid 105, which is urged to its projecting direction ( a direction shown with a letter A ) by a not-shown compression spring. When the shifting lever 101 is shifted into a "Parking" position of the gear shifting device, the solenoid 105 is inactivated, so that the solenoid rod 105a is pushed out by an urging force of the compression spring. Consequently, rotating to a direction of arrow, the locking member 103 occupies the locked position as shown in the figure. Under such a condition, since the positioning pin 107 is not in alignment with the slit 103a, the positioning pin 107 can not move downwards. Therefore, even if a knob button 111 of a knob 109 is pressed, a compression rod 113 having the positioning pin 107 fixed cannot be sunk any more, so that it is impossible to shift the shifting lever 101 from the "Parking" position to other positions.

When depressing a not-shown brake pedal under the above locked condition, the solenoid 105 is activated thereby to pull the solenoid rod 105a. Then, the locking member 103 is rotated toward the unlocked position, so that the slit 103a is brought into a condition that it is in alignment with the positioning pin 107. This disengagement the locking member 103 from the locked condition permits the positioning pin 107 to sink, so that it becomes possible to shift the shifting lever 101 upon disengaging the positioning pin 107 from a Parking position groove 115a of a positioning plate 115.

In the above-mentioned gear shifting device, however, if the solenoid 105 cannot operate normally, the shifting lever 101 is kept being locked in the Parking position, so that there is the possibility that the automobile cannot start to travel any more. In order to avoid such a problem, the gear shifting device of FIG. 1 has a hand operated locking disengageable mechanism as shown in FIGS. 2A to 2D.

The hand operated locking disengageable mechanism includes a disengaging lever 121 and a disengaging knob 123. The disengaging lever 121 is formed to be a bell crank. A base part 121a of the lever 121 is rotatably supported by the shifting lever 101 while a leading end 121b of the lever 121 is opposed to an abutting wall 103b of the locking member 103. On the other hand, the lever 121 is urged to a non-disengaging direction, i.e., a direction of B by a torsion coil spring 125. The disengaging knob 123 has a lower end connected with the disengaging lever 121 and an upper end extending into a vehicle cabin with the shifting ever 101.

In the case where the shifting lever 101 is shifted into the Parking position, if the electric system of the solenoid 105 fails, the locking member 103 would not rotate since the solenoid 105 cannot be activated in spite of pressing the brake pedal, so that it becomes impossible to operate the shifting lever 101 from the Parking position to the other positions. In this case, when depressing the disengaging knob 123 in the locked condition of FIG. 2A, the disengaging lever 121 is rotated as shown in FIG. 2B in a direction of an arrow C therein, opposing an urging force of the torsion coil spring 125. Consequently, the leading end 121b of the lever 121 presses the abutting wall 103b of the locking member 103 and then forcingly rotates it to the locking disengaging position, whereby it becomes possible to shift the shifting lever 101 from the Parking position to the other positions.

In the above-mentioned gear shift device, however, the handling of the disengaging knob 123 of the hand operated locking disengageable mechanism requires no special tool whereby the shifting operation of the shifting lever 101 from the Parking position to the other positions may be carried out against the driver's will. Therefore, it is desired to improve such a device.

SUMMARY OF THE INVENTION

It is therefore an object of the present invention to provide a gear shifting device which is so constructed that a manual operation of a locking member cannot be completed without using a tool.

The objects of the invention described above can be accomplished by a gear shifting device comprising:

a frame;

a shifting lever provided on an underside thereof with a positioning pin and pivotably attached to the frame;

a locking member pivotably attached to the frame for preventing the positioning pin from falling when the shifting lever is in a Parking position;

an actuator for operating the locking member; and a hand-operated locking disengageable mechanism including;

a) a disengaging member slidably attached to the frame for move the locking member to its locking- release position where the positioning pin is not locked;

b) a core pin removably attached to the frame so as to oppose the disengaging member, the core pin being rotatable between its locked position and unlocked position by aid of a tool;

c) a lid member removably attached to the frame so as to cover the core pin; and d) urging means for urging the disengaging member toward said core pin.

With the above-mentioned arrangement, in order to move the locking member from the locked position to the unlocked position manually, the lid member is firstly removed so as to expose the core pin. Then, after the core pin has been removed by using the tool, the disengaging member is manipulated. This manual operation of the disengaging member allows the locking member to be rotated to the unlocked position, whereby it becomes possible to shift the shifting lever from the Parking position to the other driving positions. In this way, since the special tool is required in case of releasing the locked condition of the locking member, it becomes possible to avoid an unexpected releasing of the locking condition.

In the present invention, since the position of the core pin can be controlled between the locked position and the unlocked position by a single action using the special tool, the operability can be improved.

Furthermore, since the core pin is provided with no threaded parts, it is possible to improve formability thereof in case of molding it of synthetic resin, whereby the manufacturing cost can be saved and the automization of molding can be realized.

In the present invention, since the core pin is covered with the lid member, it is possible to prevent dust from laying on the core pin, so that the maintenance of device can be facilitated.

Other objects and features of the present invention will become more fully apparent from the following description and appended claims taken in conjunction with the accompanying drawings.

BRIEF DESCRIPTION OF THE DRAWING

FIGS. 2A to 2D are explanatory views showing operations of the conventional gear shifting device of FIG. 1, in which FIG. 2A shows a locked condition thereof, FIG. 2B an unlocked condition thereof, FIG. 2C a view from a direction of IIC of FIG. 2A, and FIG. 2D is a view from a direction of IID of FIG. 2B;

DESCRIPTION OF THE PREFERRED EMBODIMENT

Figure 1:
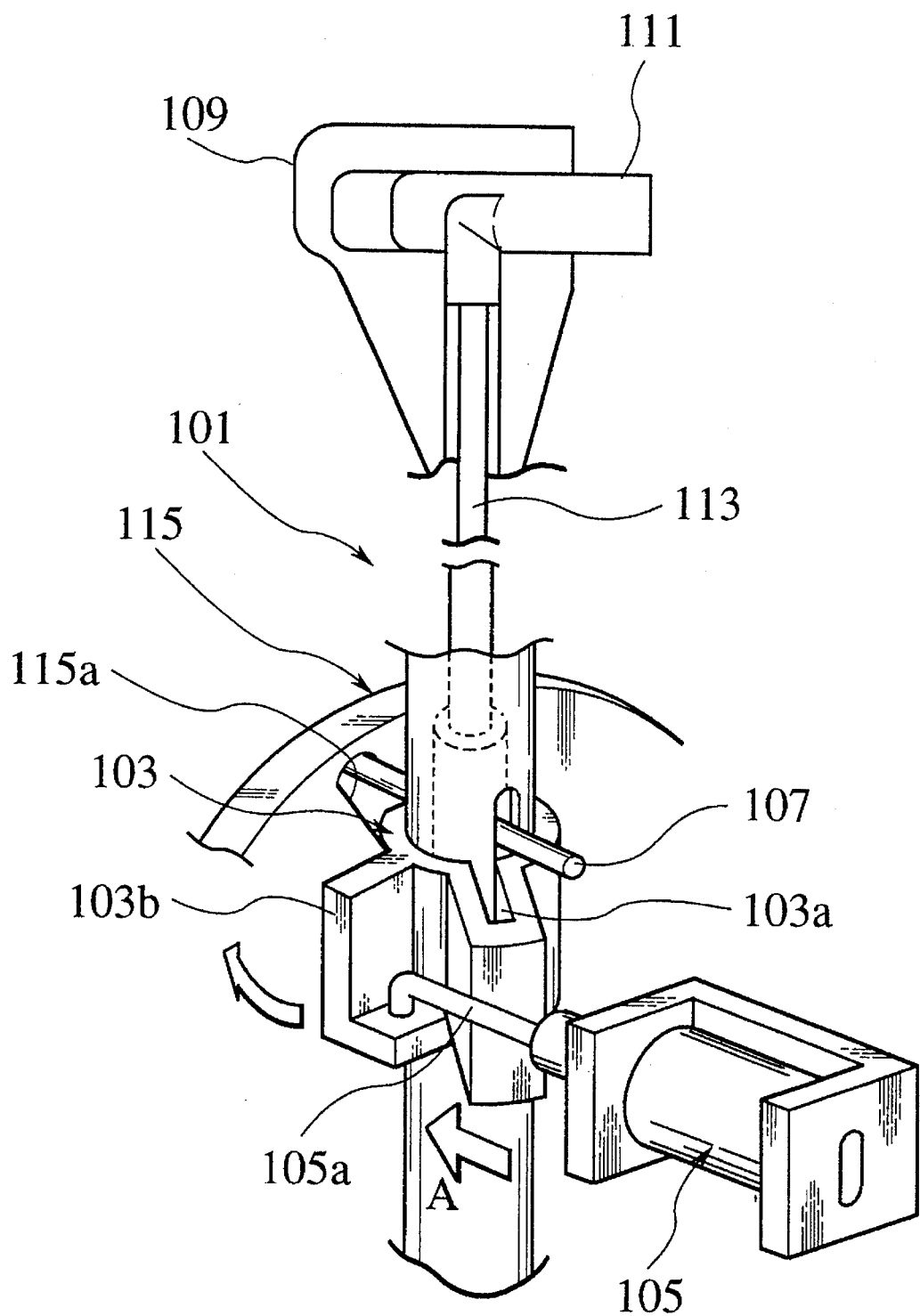
FIG. 1 is a perspective view showing a main part of a conventional gear shifting device.
Figure 2A:
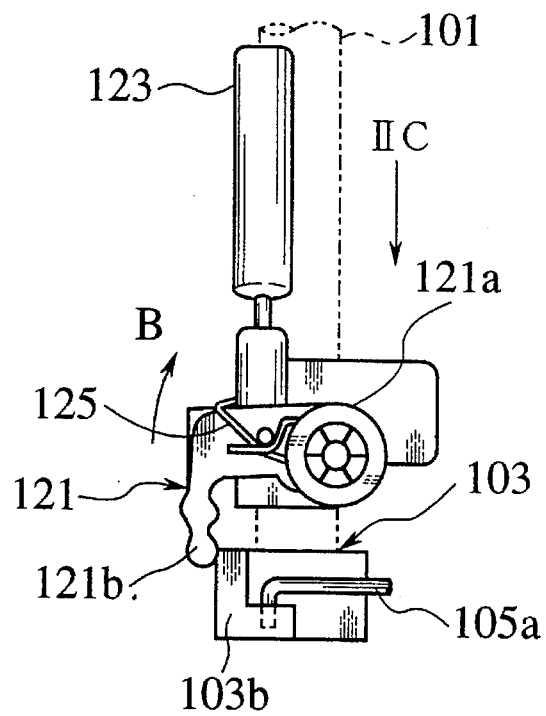
Figure 2B:
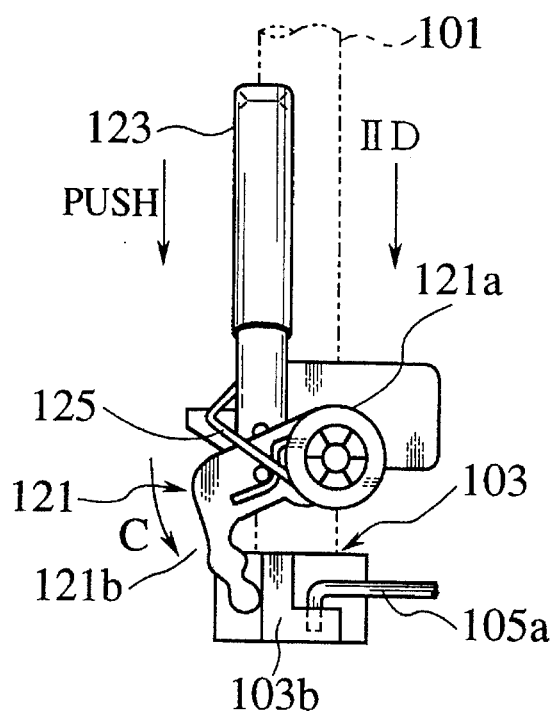
Figure 2C:
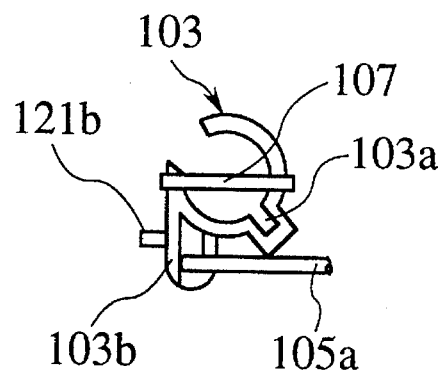
Figure 2D:
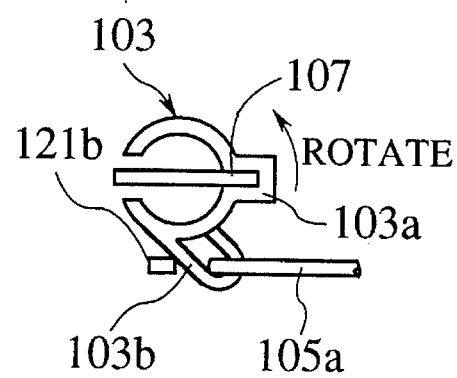

An embodiment of the present invention is now described with reference to the drawings.

In the figures, an alphabet E designates a gear shifting device of an automatic transmission for a vehicle in accordance with the embodiment of the present invention. The device E includes a shifting lever 10 provided on a downside thereof with a positioning pin 11. The shifting lever 10 is pivotably mounted on a frame 20. Also pivotably mounted on the frame 20 is a locking member 30 which serves to prevent the positioning pin 11 from falling when the shifting lever 10 occupies in its "Parking" position. The gear shifting device E further includes an electro-magnetic actuator 40 for activating the locking member 30.

According to the present invention, the frame 20 is provided with a hand operated locking disengageable mechanism 50. The hand-operated locking disengageable mechanism 50 consists of a disengaging member 51 which is slidably arranged thereon to actuate the locking member 80 to a locking-release direction, an urging means 52 for applying force of restitution on the disengaging member 51, a core pin 58 which is detachably mounted on the frame 20 to oppose the disengaging member 51 and which is capable to rotate between the locked position and the unlocked position by manipulation of the tool, and a lid member 54 which is detachably mounted to the frame so as to cover the core pin 53.

We now describe the construction of the gear shifting device E in detail.

Figure 3:
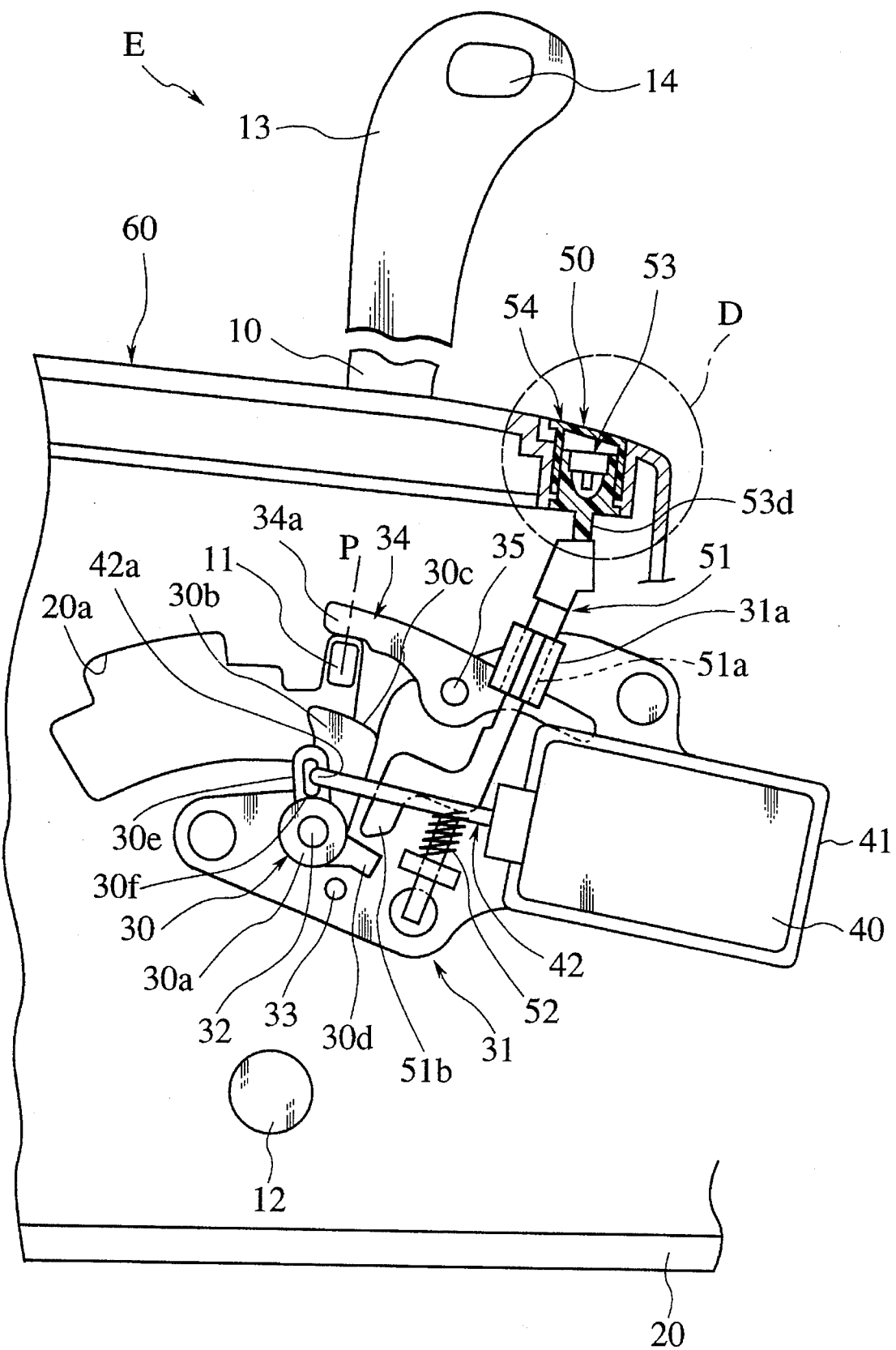
FIG. 3 is a front view showing a gear shifting device of an automatic transmission for vehicle in accordance with the present invention, including a partial cross section thereof.

The frame 20, which is made of synthetic resinous material, is secured to a vehicle body, provided at an intermediate portion thereof with a positioning recess 20a. The positioning recess 20a has grooves formed in positions corresponding to a "Parking" position, a "Reverse" position, a "Neutral" position, a "Drive" position, a "2nd." position and a "1st." position, respectively. Referring to FIG. 3, a rightmost position groove 20a of the grooves in the figure designates the Parking position P. Note that, the remaining positions besides the Parking position P and the Neutral position will be referred as "Driving" positions hereinafter in this specification.

A tubular shifting lever 10 is pivotably attached to the frame 20 by a pivot shaft 12. The positioning pin 11 is fixed to a not-shown compression rod which is inserted into the shifting lever 10 so as to slide along an axial direction thereof. The above compression rod is always urged upward by a not-shown compression spring.

A knob 18 is fixed on an upper part of the shifting lever 10. Inside the knob 13, a knob button 14 is slidably arranged to expose a Part thereof to the outside. By pushing the knob button 14 opposing spring force of the compression spring, the positioning pin 11 in engagement with the positioning groove 20a can be moved downwardly thereby to disengage therefrom.

The locking member 30 of synthetic resin is shaped to be a bell crank and has a base part 30a pivotably attached to a pivot shaft 82 which stands from a mounting bracket 31 of synthetic resin attached to the frame 20. An arm part 30b, which extends upward from the base part 30a, is provided on a top surface thereof with a locking part 30c which is arc-shaped to have the axis of the pivot shaft 32 as a center. Another arm part 30d, which extends to the righthand side, is positioned opposite to a lower end of the disengaging member 51. The clockwise rotation of the locking member 30 is adapted to be limited by a stop pin 33 secured on the mounting bracket 31.

A solenoid 40 as the electro-magnetic actuator is accommodated in a solenoid casing 41 integrally formed with the mounting bracket 31. Slidably accommodated in the solenoid casing 41 is a solenoid rod 42 which is urged to project outwardly from the casing 41 by a not-shown compression spring. A hook part 42a provided on a tip of the solenoid rod 42 is engaged in an elongated hole 30f formed in an arm part 30e projecting from the base part 30a of the locking member 30.

When the shifting lever 10 is in the Parking position P and the brake pedal is trampled, the solenoid 40 is activated (ON), whereby the solenoid rod 42 is withdrawn inside the casing 41, opposing the spring force of the compression spring. Thus the locking member 30 is rotated to the clockwise direction so as to withdraw the locking part 30c out of a moving trace of the positioning pin 11 in the Parking position P.

Figure 13:
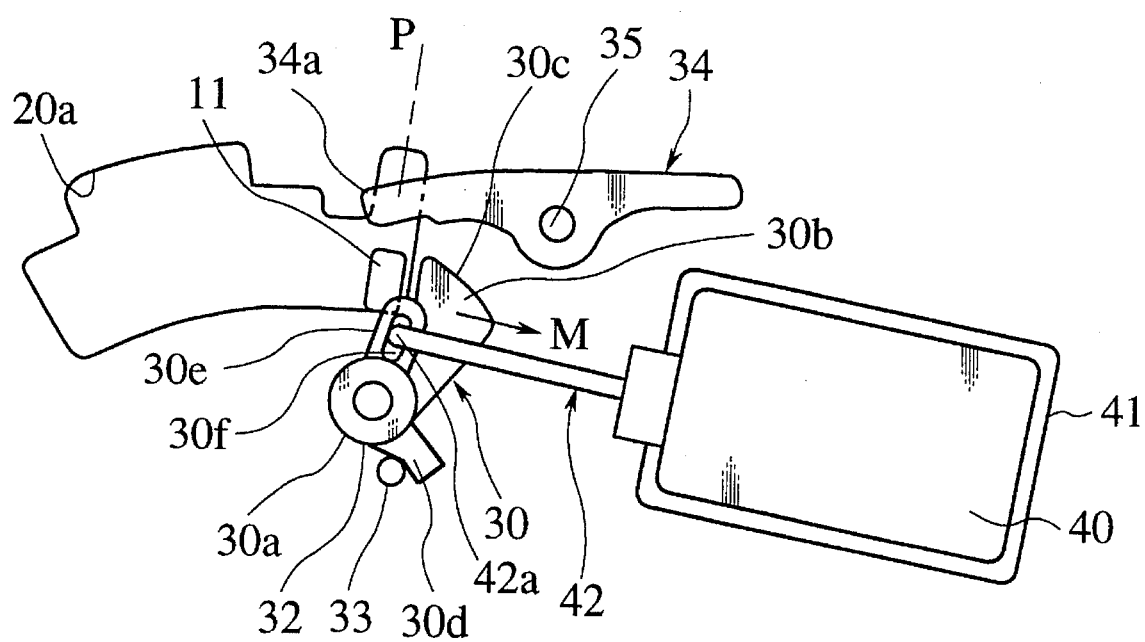
FIG. 13 is an explanatory view showing the gear shifting device in which the locking member is brought into the locking-release position by an electro-magnetic actuator.

The mounting bracket 31 is provided with a switch lever 34 which is pivotably attached to the bracket 31 by means of a pivot shaft 35 and which is urged to rotate in the counter-clockwise direction by a not-shown spring. One end of the switch lever 34 is engaged with the positioning pin 11 which is in the Parking position. As shown in FIG. 13, when the end 34a of the switch lever 34 is disengaged with the positioning pin 11, the lever 34 is rotated in the counter-clockwise direction until it abuts on a not-shown pin, whereby the lever 34 cuts off an electrical connection between the solenoid 40 and a power supply.

As mentioned above, the hand operated locking disengageable mechanism 50 comprises the disengaging member 51, the urging means 52, the core pin 53 and the lid member 54.

The disengaging member 51 of synthetic resin is composed of a sliding part 51a and an action part 51b which is formed to bend from a lower end of the sliding part 51a. The slide part 51a is slidably inserted into a guide part 31a formed integral with the mounting bracket 31. On the other hand, the action part 51b is arranged so as to oppose a lower end thereof to the other arm part 30d of the locking member 30. The disengaging member 51 is urged upward by a compression spring 52 as the urging means.

Figure 4:
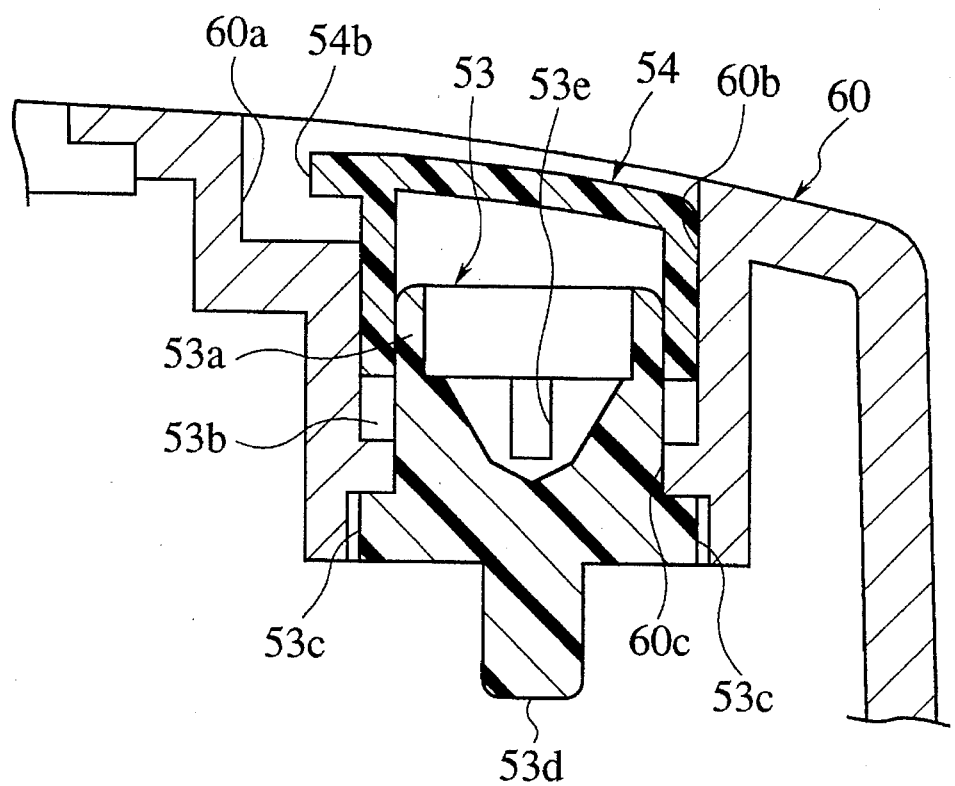
FIG. 4 is an enlarged cross sectional view of a circular section D of FIG. 3.
Figure 5:
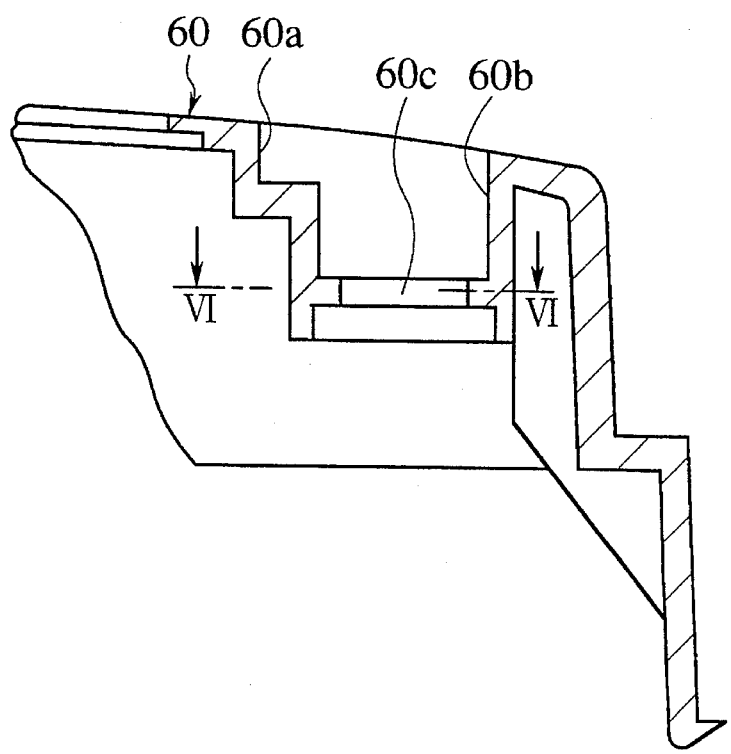
FIG. 5 is a cross sectional view showing an indicator of FIG. 4.
Figure 6:
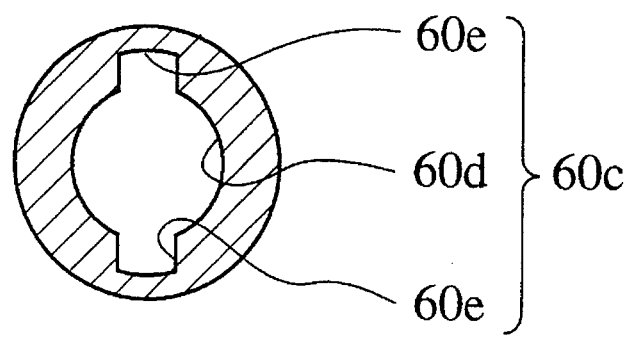
FIG. 6 is a cross sectional view taken along a line VI—VI of FIG. 5.

As obviously shown in FIG. 4, the core pin 53 and the lid member 54 are removably attached to an indicator 60 which is mounted on a top part of the frame 20 so as to close an opening thereof. The indicator 60 is provided with a not-shown scale cover which shows the respective shifting positions of the shifting lever 10. As shown in FIG. 5, the indicator 60 has a recess 60a formed in a position opposite to the upper end of the disengaging member 51 so as to open upwardly. The recess 60a is provided with a circular lid-mounting part 60b which has an orifice 60c formed on a bottom surface thereof. As shown in FIG. 6, the orifice 60c consists of a circular part 60d and a pair of grooves 60e formed around the part 60d and separated from each other at predetermined angular intervals, for example 180°.

As shown in FIGS. 8 to 11, the core pin 53 of synthetic resin comprises a cylindrical part 53a, a flange part 53b formed around the cylindrical part 53a at an axially intermediate position thereof, a pair of convex parts 53c which are formed under the flange part 53b and around the cylindrical part 53a to be apart from each other at 180° angular intervals, and a projection 53d extending from a lower end of the part 53a along an axial direction thereof. Inside the cylindrical part 53a, a cross groove 53e is formed at a predetermined interval from an upper surface of the cylindrical part 53a. In this way, the core pin 53 is adapted to be rotated by the engagement of a special tool with the cross groove 53e.

A diameter of the cylindrical part 53a is established so as to be equal to a diameter of the circular part 60d of the orifice 60c and similarly, a diameter of the flange part 53b is established so as to be equal to a diameter of the circular lid-mounting part 60b. In addition, each convex part 53c is formed so as to be somewhat smaller than each groove 60e. The projection 53d is arranged in a position where it can come into contact with the upper end of the disengaging member 51. Note, around the flange part 53b and In a position corresponding to either one of the convex parts 53c, a notch 53f is so formed as to be somewhat larger than the convex part 53c. The notch 53f serves to facilitate an operator's confirmation of a position of the convex part 53c when rotating the core pin 53.

Figure 7:
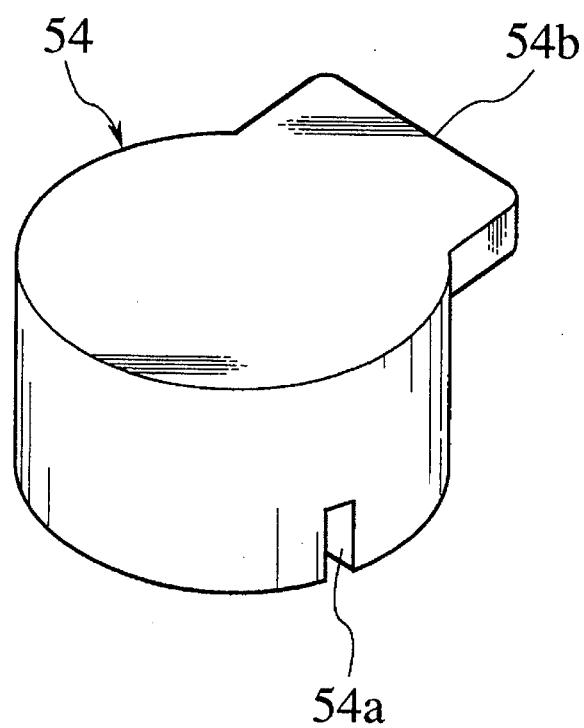
FIG. 7 is a perspective view showing a lid member of FIG. 4.
Figure 8:
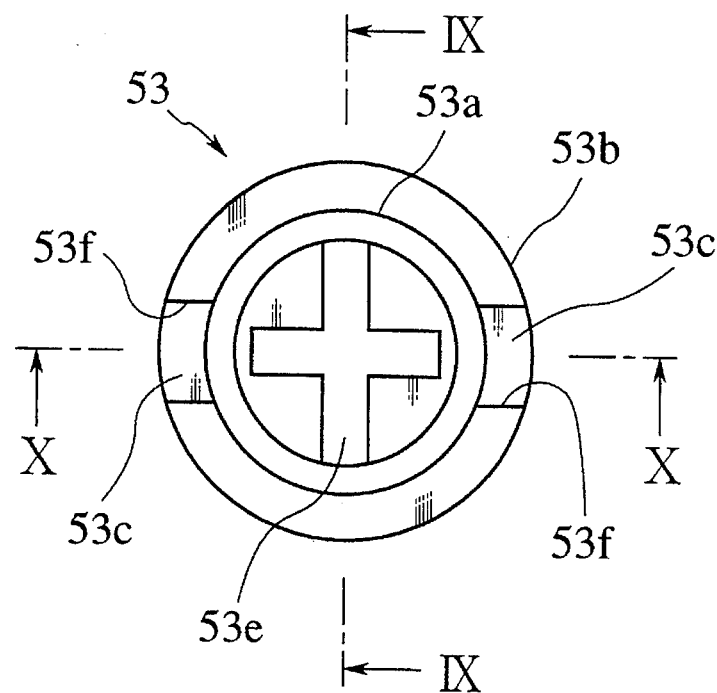
FIG. 8 is a top view of a core pin of FIG. 4.
Figure 9:
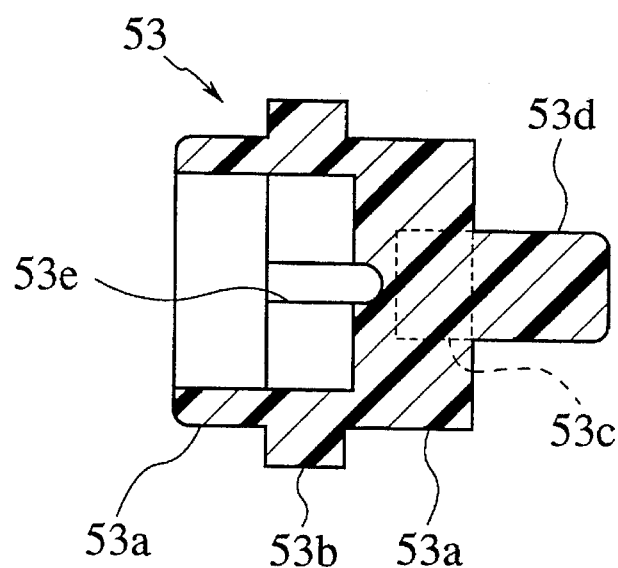
FIG. 9 is a cross sectional view taken along a line IX—IX of FIG. 8.
Figure 10:
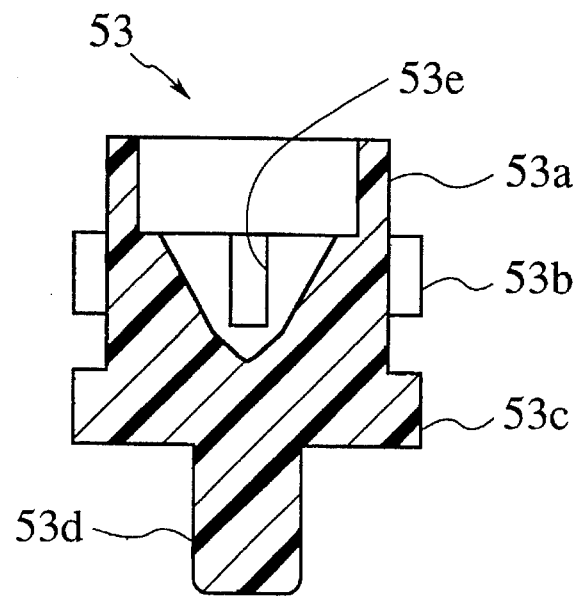
FIG. 10 is a cross sectional view taken along a line X—X of FIG. 8.
Figure 11:
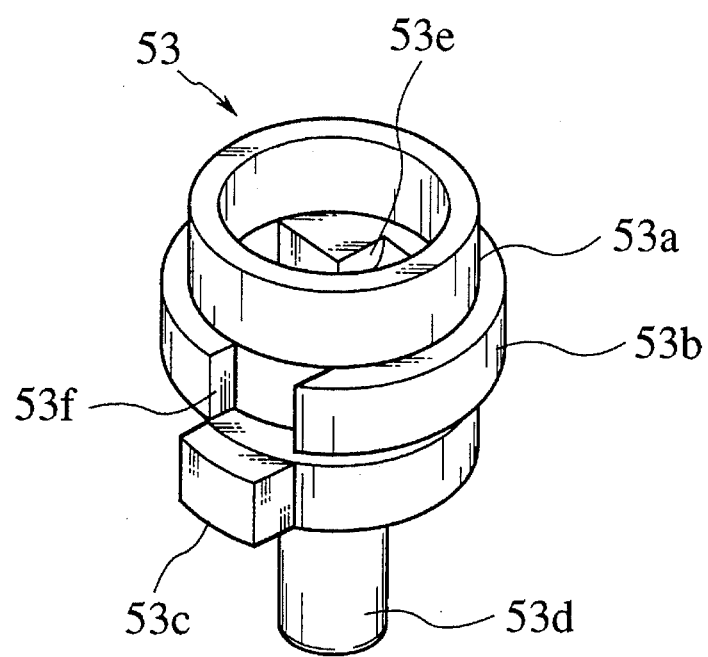
FIG. 11 is a perspective view showing the core pin of FIG. 10.

The lid member 54 is made of synthetic resin and shaped to be substantially cylindrical as shown in FIG. 7. Further, the member 54 is adapted in such a manner that an outer circumferential surface thereof and an inner circumferential surface thereof are fitted to the lid-mounting part 60b and the cylindrical part 53a of the core pin 53, respectively. The lid member 54 is provided on the outer circumferential surface with a slit 54a and provided on the top surface with a collar 54b for detachment. In assembling, the lid member 54 is pressingly fitted into the lid-mounting part 60b, deflecting the slit 54a slightly. Then, upon accommodating the collar 54b in the recess 60a, the lid member 54 is adapted so that the top surface is generally in a plane with the top surface of the indicator 60.

The gear shifting device E of the present invention operates as follows.

Figure 12:
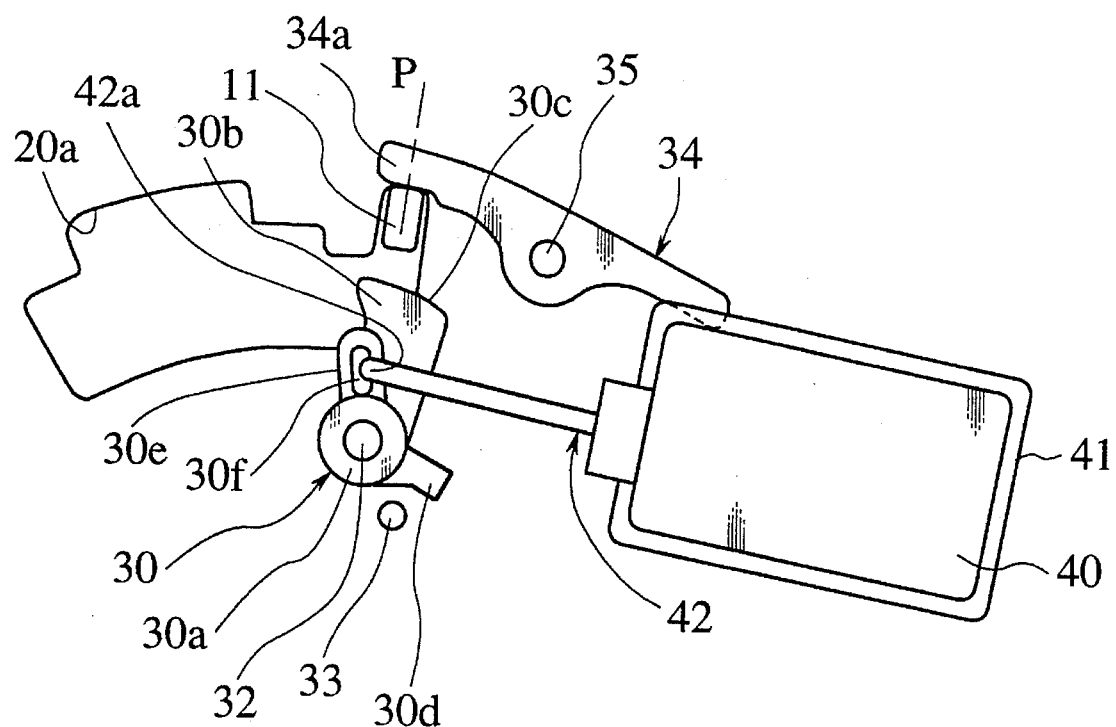
FIG. 12 is an explanatory view showing the gear shifting device in accordance with the present invention, in which a locking member is in a locking position.

Under condition that the shifting lever 13 is shifted into the Parking position P as shown in FIGS. 3 and 12, the solenoid 40 is inactivated, so that the locking member 30 is rotated up to a position where the locking part 30c faces the positioning pin 11. In such a condition, even if the knob button 14 is pushed to move the positioning pin 11 downwardly, the movement of the pin 11 is restricted since it is brought into contact with the locking part 30c of the locking member 80. Therefore, in this condition, the device E is capable of preventing the shifting lever 13 from moving from the Parking position to the driving positions.

In order to shifting the shifting lever 13 from the Parking position P to the other driving positions, the engine is firstly started and the brake pedal is depressed. Then, the solenoid 40 is activated and the solenoid rod 42 is withdrawn to a direction of M shown in FIG. 13, so that the locking member 30 is rotated in the clockwise direction till the arm part 30d comes into contact with the stop pin 33. Consequently, it becomes possible to withdraw the locking part 30c of the locking member 30 from the movement trace of the positioning pin 11.

Figure 14:
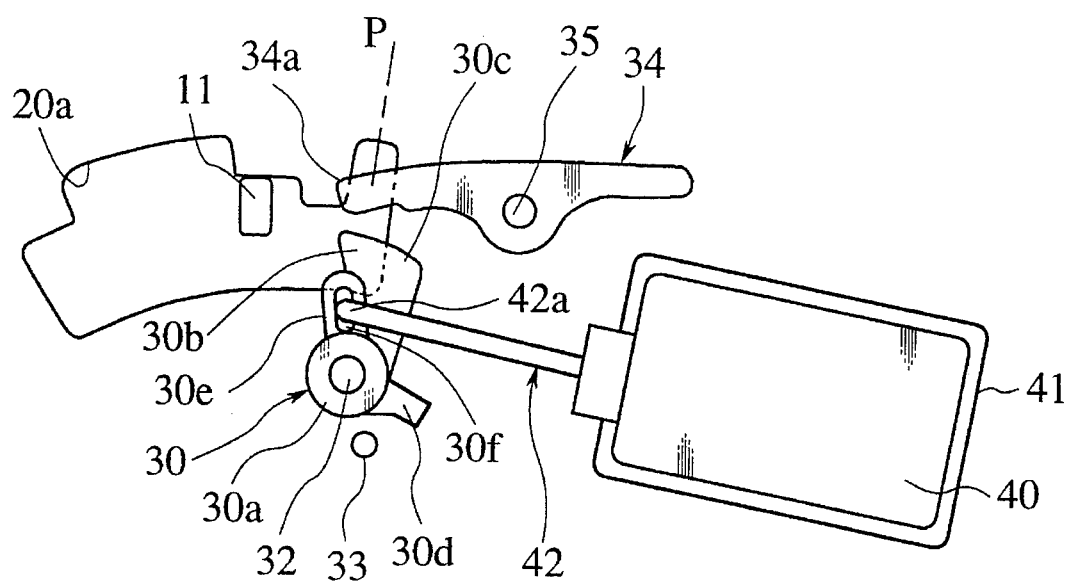
FIG. 14 is an explanatory view showing the gear shifting device in which a shifting lever is shifted into a driving position.

Under this condition, by pushing the knob button 14 thereby removing the positioning pin 11 from the Parking position P, it is possible to shift it into the other driving positions, as shown in FIG. 14. During this operation, the switch lever 34 is rotated in the counter-clockwise direction by the spring force, so that the electrical connection between the solenoid 40 and the power supply is cut off. Then, the solenoid 40 is turned off, whereby the locking member 30 is returned into the condition shown in FIG. 12.

Hereat, under condition that the shifting lever 13 is in the Parking position and if the solenoid 40 is out of order by any trouble caused in the electrical system etc., the above locking condition can be released by the hand-operated locking disengageable mechanism 50, as follows.

Figure 15:
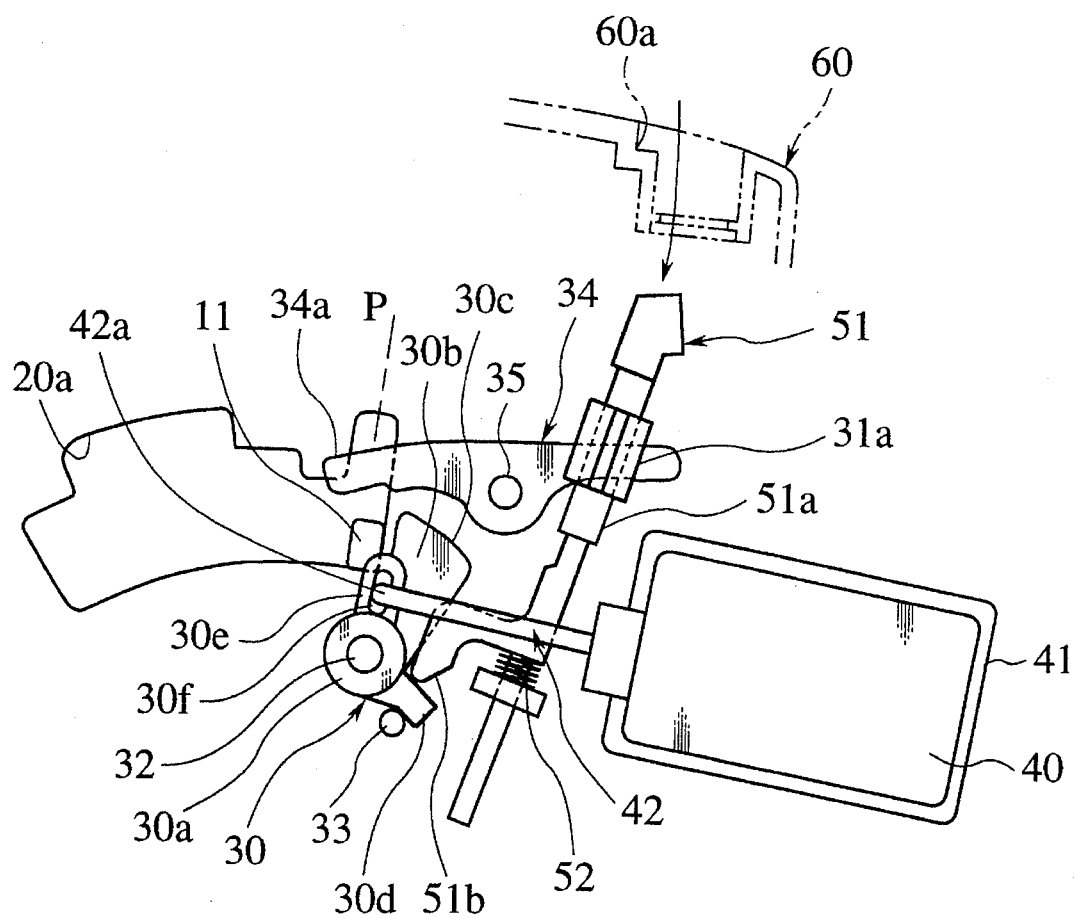
FIG. 15 is an explanatory view showing the gear shifting device in which the locking condition of the locking member is manually released by a hand-operated locking disengageable mechanism.

First of all, by hanging the collar 54b of the lid member 54 on a tool or finger, the collar 54b is lifted from the recess 60a of the indicator 60, whereby the lid member 54 is removed from the lid-mounting part 60. Thus the core pin 53 is exposed and then, upon engaging the special tool with the cross groove 53e, the pin 53 is rotated. When the convex parts 53c of the core pin 53 are in alignment with the recesses 60e of the notch groove 60c of the indicator 60, the core pin 53 projects upward by the spring force of the compression spring 52, whereby it is possible to pick up the core pin 53 from the indicator 60. On this condition, as shown in FIG. 15, when pressing the top of the disengaging member 51 to a direction of N through the recess 60a of the indicator 60 by means of the tool, the disengaging member 51 is fallen opposing to the spring force of the compression spring 52 and the locking member 30 is rotated by the lower end of the acting part 51b, so that the arm part 30d rotates till it comes into contact with the stop pin 33. In this way, it is possible to withdraw the locking part 30c of the locking member 30 from the movement trace of the positioning pin 11 in the Parking position P thereby to enable the shifting lever to be shifted from the Parking position P to the other driving positions.

When the tool is not pressed on the disengaging member 51, then it rises up to the position where the upper end of the member 51 appears in the recess 60a of the indicator 60. Hereat, the core pin 53 is inserted into the recess 60a, engaging the tool with the cross groove 53e. After the convex parts 53c of the core pin 53 have been inserted into the grooves 60e of the orifice 60c of the indicator 60, the core pin 53 is rotated, whereby it can be locked in the indicator 60. At this time, the upper end of the disengaging member 51 is urged by the projection 53d of the core pin 53, whereby the member 51 can be maintained in the condition shown in FIG. 3.

As mentioned above, in the gear shifting device E, it becomes impossible for an operator to release the locking condition of the device manually without using the special tool. In other words, if he does not use the particular tool, he cannot operate the shifting lever 10 from the Parking position to the other driving positions. Therefore, according to the present invention, it is possible to avoid an unexpected releasing of the locking condition.

According to the invention, the position of the core pin 53 can be easily controlled between the locked position and the unlocked position by a single action using the tool. In addition, since, when converting the pin 53 into the unlocked position, the core pin 53 automatically projects upward due to the compression spring 52 as urging means, the arrangement permits manual operability in releasing the locking condition to be improved.

Furthermore, since the core pin 53 is provided with no threaded parts, it is possible to improve formability thereof in case of molding it of synthetic resin, whereby the manufacturing cost can be saved and the automization of molding can be realized.

Finally, in the present invention, since the core pin 53 is covered with the lid member 54, it is possible to prevent dust from laying on the core pin 53, so that the maintenance of device can be facilitated.

What is claimed is:

1. A gear shifting device comprising:
   a frame;
   a shifting lever provided on an underside thereof with a positioning pin and pivotally attached to said frame;
   a locking member pivotably attached to said frame for preventing said positioning pin from falling when said shifting lever is in a parking position;
   an actuator for operating said locking member; and
   a hand-operated locking disengageable mechanism including;
      a) a disengaging member slidably attached to said frame for moving said locking member to a locking-release position where the positioning pin is not locked;
      b) a core pin removably attached to said frame so as to oppose said disengaging member, said core pin being rotatable between a locked position and an unlocked position by aid of a tool;
      c) a lid member removably attached to said frame so as to cover said core pin; and
      d) urging means for urging said disengaging member toward said core pin,
   wherein said core pin includes a cylindrical part, a flange part formed around said cylindrical part, and a pair of convex parts formed around said cylindrical part and under said flange part, and said core pin is provided inside said cylindrical part with an engagement groove for engaging with said tool, and
   wherein said flange part is provided with at least one notch which is so arranged as to face one of said convex parts.

2. A gear shifting device as claimed in claim 1, wherein said locking member includes a base part and two arm parts projecting from said base part and wherein one of said arm parts is engaged with said actuator.

3. A gear shifting device as claimed in claim 1, wherein said disengaging member has an action part arranged so as to be opposite to the other arm part of said locking member.

4. A gear shifting device as claimed in claim 3, further comprising a stop pin fixed to said frame, wherein the rotation of said locking member is limited by contact of said stop pin with the other arm part.

5. A gear shifting device as claimed in claim 1, wherein said core pin and said lid member are removably attached to an indicator for indicating respective shifting positions that said shifting lever can occupy.

6. A gear shifting device as claimed in claim 5, wherein said indicator has a recess formed opposite to an end of said disengaging member for fitting said core pin therein and wherein said recess is provided on a bottom thereof with an orifice which consists of a circular part and a pair of grooves formed around said circular part.

7. A gear shifting device as claimed in claim 1, wherein said flange part has a diameter larger than that of said orifice of said indicator.

8. A gear shifting device as claimed in claim 1, wherein said flange part is smaller than each of said grooves of said recess.

9. A gear shifting device as claimed in claim 1, wherein said lid member is shaped to be substantially cylindrical and wherein said lid member has a slit formed on an outer circumferential surface thereof and a collar formed on a top surface thereof.

10. A gear shifting device as claimed in claim 1, wherein said lid member is made of synthetic resin.

11. A gear shifting device as claimed in claim 1, wherein said core pin is made of synthetic resin.

12. A gear shifting device as claimed in claim 1, wherein said urging means comprises a compression spring.

* * * * *